(12) United States Patent
Kind et al.

(10) Patent No.: US 9,254,516 B2
(45) Date of Patent: Feb. 9, 2016

(54) METHOD OF FORMING ANCHORS

(75) Inventors: Simon Kind, Ruggell (CH); Simon Oppeneiger, Hoechst (AT); Hideki Shimahara, Buchs (CH)

(73) Assignee: HILTI AKTIENGESELLSCHAFT (LI)

( * ) Notice: Subject to any disclaimer, the term of this patent is extended or adjusted under 35 U.S.C. 154(b) by 247 days.

(21) Appl. No.: 13/572,048

(22) Filed: Aug. 10, 2012

(65) Prior Publication Data

US 2013/0040743 A1 Feb. 14, 2013

Related U.S. Application Data

(63) Continuation of application No. PCT/EP2010/051760, filed on Feb. 12, 2010.

(51) Int. Cl.
*B21H 1/18* (2006.01)
*B21H 3/02* (2006.01)
*B21H 7/18* (2006.01)
(Continued)

(52) U.S. Cl.
CPC .................. *B21H 1/18* (2013.01); *B21H 3/022* (2013.01); *B21H 7/182* (2013.01); *B21B 31/10* (2013.01); *B21B 31/14* (2013.01)

(58) Field of Classification Search
CPC B21B 1/0805; B21B 1/227; B21B 2001/081; B21B 1/02; B21B 1/024; B21B 15/0035; B21H 1/18; B21H 3/022; B21H 7/182; B21H 1/20; B21H 1/22; B21H 3/02; B21H 3/046; B21H 3/06; E02D 5/74; E04B 1/38; E21D 20/00; E21D 20/025; E21D 21/00; E21D 21/008; E21D 23/00; E21D 23/01; F16B 13/003; F16B 13/065; F16B 13/144; F16B 13/0858; F16B 29/00; F16B 35/00; F16B 35/04
USPC ............... 470/2, 5, 8, 11, 12, 3, 4, 19, 23, 57; 72/70, 71, 95, 98, 100, 112, 118, 102, 72/103, 104, 469, 470; 29/412
See application file for complete search history.

(56) References Cited

U.S. PATENT DOCUMENTS 387,184 A * 7/1888 Rogers ............................. 72/71
948,616 A * 2/1910 Smith ............................. 470/23
(Continued)

FOREIGN PATENT DOCUMENTS

WO 0243896 A1 6/2002

OTHER PUBLICATIONS

PCT International Search Report, dated Sep. 28, 2010 in Application No. PCT/EP2010/051760 (3 pages).

*Primary Examiner* — Alexander P Taousakis
*Assistant Examiner* — Lawrence Averick
(74) *Attorney, Agent, or Firm* — McAndrews, Held & Malloy, Ltd.

(57) ABSTRACT

The inventive method of forming anchors comprises following steps. A rod-shaped workpiece is roll-formed by penetrating the rod-shaped workpiece with two wedge-shaped tools at two points. The two points are arranged on opposite sides and axially separated of a plane perpendicular to an axis of the rod-shaped workpiece. The two wedge-shaped tools are axially approaching to the plane while the rod-shaped workpiece is revolved around the axis. The roll-formed workpiece is separated along the plane for forming two bolts. A sleeve is applied around the anchor bolts.

22 Claims, 4 Drawing Sheets

(51) Int. Cl.
   *B21B 31/10* (2006.01)
   *B21B 31/14* (2006.01)

(56) References Cited

U.S. PATENT DOCUMENTS

| | | | | |
|---|---|---|---|---|
| 2,356,686 A | * | 8/1944 | Newall | 470/8 |
| 2,676,390 A | * | 4/1954 | MacDonald | 72/365.2 |
| 2,770,818 A | * | 11/1956 | Lee et al. | 470/12 |
| 3,058,211 A | * | 10/1962 | Axtell | 29/509 |
| 3,180,203 A | * | 4/1965 | Vaughn | 411/34 |
| 3,208,257 A | * | 9/1965 | Holub | 72/108 |
| 3,340,720 A | * | 9/1967 | Chartier | 72/389.7 |
| 3,588,933 A | * | 6/1971 | Shinopulos et al. | 470/9 |
| 4,489,581 A | * | 12/1984 | Davidovich et al. | 72/70 |
| 4,576,033 A | * | 3/1986 | Corrette | 72/469 |
| 4,683,743 A | * | 8/1987 | Fitzpatrick | 72/88 |
| 4,996,860 A | | 3/1991 | Shinjo | |
| 6,334,349 B1 | * | 1/2002 | Rolf | 72/84 |
| 7,465,128 B2 | * | 12/2008 | Bruneau | 405/259.3 |
| 8,210,784 B2 | * | 7/2012 | Hartmann | 411/353 |
| 8,382,601 B2 | * | 2/2013 | Gensert | 470/8 |
| 2010/0048309 A1 | * | 2/2010 | Gensert | 470/10 |

* cited by examiner

METHOD OF FORMING ANCHORS

RELATED APPLICATIONS

This application is a continuation of International Application No. PCT/EP2010/051760, having an International filing date of Feb. 12, 2010, which is hereby incorporated by reference herein in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a method of forming anchors.

Expansion anchor systems are used in building construction in larger numbers. Thus, manufacturing methods of high efficiency are requested.

BRIEF SUMMARY OF THE INVENTION

The inventive method of forming anchors comprises following steps. A rod-shaped workpiece is roll-formed by penetrating the rod-shaped workpiece with two wedge-shaped tools at two points. The two points are arranged on opposite sides and axially separated of a plane perpendicular to an axis of the rod-shaped workpiece. The two wedge-shaped tools are axially approaching to the plane while the rod-shaped workpiece is revolved around the axis. Thus material of the workpiece is displaced by the wedge-shaped tools towards the plane. The roll-formed workpiece is separated along the plane for forming two bolts. A sleeve is applied around the anchor bolts.

The inventive method manages to roll-shape an increased diameter with sufficient surface quality. Surface defects by this method are shifted to about the middle of the workpiece. In the final anchor product the defects are located at the anchor's end and to which neither is under load nor limits for the setting process.

In an embodiment, a third wedge-shaped tool penetrates the rod-shaped workpiece in the plane while the two wedge-shaped tools are approaching the plane. The third wedge-shaped tool considerably helps to build a larger diameter for a conical area of a bolt.

In an embodiment, a flat-shaped tool penetrates the workpiece in an area between the two wedge-shaped tools and forms a void along the axis. The appearance of voids along the axis is usually due to bad settings of the roll-forming process. In this embodiment, the local generation of a void is, however, beneficial for an increase of the diameter. The material at the center of a conical portion of an anchor system does basically not affect the quality of an anchor.

In an embodiment, a flat-shaped tool penetrates the workpiece in an area between the two wedge-shaped tools, wherein the flat-shaped tool and the workpiece have a contact area of first dimension parallel to the axis which equals at least a half a diameter of the workpiece.

In an embodiment, a flat-shaped tool penetrates the workpiece in a contact area between the two wedge-shaped tools. The contact area of the flat-shaped tool and the workpiece has a first dimension parallel to the axis and a second dimension, which is tangential to the circumference of the workpiece. The first dimension is at least twice as large as the second dimension. The flat-shaped tool penetrates the workpiece over the whole contact area, and thus applies a force on the workpiece along the contact area. A significant part of material is going to flow in circumferential direction where the flat tool does not contact the workpiece. The workpiece will depart from its circular cross-section to a more elliptical or oval shape. The material of the non-circular shape is subdue to large stress and will relax by forming a void along the axis.

In an embodiment, a flat-shaped tool penetrates the workpiece by having a radial distance to the axis of 0.1% to 2% less than a diameter of the workpiece. The diameter of the workpiece is initial diameter or the diameter before the tool contacts the workpiece.

In an embodiment, a flat-shaped tool increases a radial distance of the flat-shaped tool to the axis increases after a void is generated.

In an embodiment, the wedge-shaped tools have inclined facets which have a first part of first inclination for tapering a portion of the workpiece to a cylindrical tapered portion and a second part of a second inclination for forming a conical portion. The second part succeeds the first part when the two wedge-shaped tools have approach closer than a predefined distance. The predefined distance defines the axial length of a cylindrical tapered portion of bolts and where the tapered portion merges into a conical portion.

The novel features of the present invention, which are considered as characteristic for the invention, are set forth in the appended claims. The invention itself, however, both as to its construction and its mode of operation, together with additional advantages and objects thereof, may be best understood from the following detailed description of the invention, when read with reference to the accompanying drawings.

DETAILED DESCRIPTION OF THE INVENTION

Figure 1:
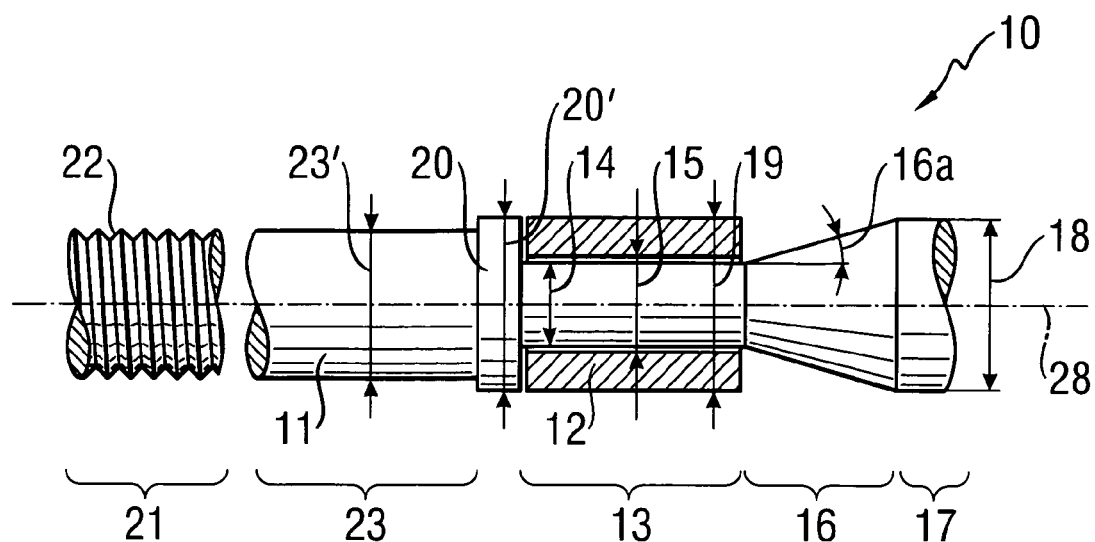
FIG. 1 is an anchor.

FIG. 1 illustrates an expansion anchor assembly 10 made up of a bolt 11 and a sleeve-like expansion member 12.

The expansion member 12 circumferentially encompasses or encloses a tapered portion of the bolt 11. The tapered portion 13 is preferably of cylindrical shape. An outer diameter 14 of the tapered portion 13 is slightly smaller than an inner diameter 15 of the expansion member 12 so the expansion member 12 can axially slide along the tapered portion 13 with low friction. Axial dimensions of the tapered portion 13 and the expansion member 12 may be about equal.

The tapered portion 13 merges into a (frusto-) conical portion 16 of increasing diameter towards a leading end 17 of the bolt 11. A cone angle 16a of the conical portion 16 may be less than 60 degrees. A largest diameter 18 of the conical portion 16 is about equal to or slightly larger than an outer diameter 19 of the expansion member 12. The conical portion 16 is designed to spread the expansion member 12 in radial direction while the conical portion 16 is pulled into the expansion member 12. The expansion member 12 may have slits along an axial direction to reduce forces necessary to spread the expansion member 12.

The bolt 11 has a collar 20 which is adjacent to the tapered portion 13 opposite the conical portion 16. An outer diameter 20' of the collar 20 is significantly larger than the outer diameter 14 of the tapered portion 13. The increase of the outer diameter is stepwise. A difference of the two outer diameters equals at least half of a wall thickness of the expansion member 12.

A trailing portion 21 of the bolt 11 has means for connecting. These means may comprise at least one of an external thread 22, an internal thread, a hook, an ear, etc. An intermediate portion 23 between the collar 20 and the means for connecting 22 may be cylindrical. A diameter 23' of the intermediate portion 23 is smaller than the largest diameter 19 of the conical portion 16 and may be equal to the outer diameter of the collar 20.

The anchor 10 is installed by firstly drilling a hole of a diameter equal the largest diameter 18 of the conical portion 16. The anchor 10 is punched into the hole with its leading end 17 pointing towards the bottom of the hole. The expansion member 12 contacts the wall of the hole due to their diameters. The collar 20 ensures that the expansion member 12 is forced into the hole along with the bolt 11. When the bolt 11 is pulled out of the hole, the expansion member 12 stays in place due to its contact with the wall of the hole. The conical portion 16 is forced into the expansion member 12 leading to an expansion member 12 spread against the hole's wall.

The conical portion 16 needs a smooth surface such that friction of the expansion member 12 on the conical portion 16 is negligible compared to friction of the expansion member 12 with the hole's wall.

An exemplary method for manufacturing such an expansion anchor assembly is explained with reference to the FIGS. 2 to 5. The method makes use of at least three steps. At first a contour of the bolts 11 is roll-formed. Secondly, the bolts 11 are individualized. Afterwards, the expansion member 12 is applied to the bolts 11.

Figure 2:
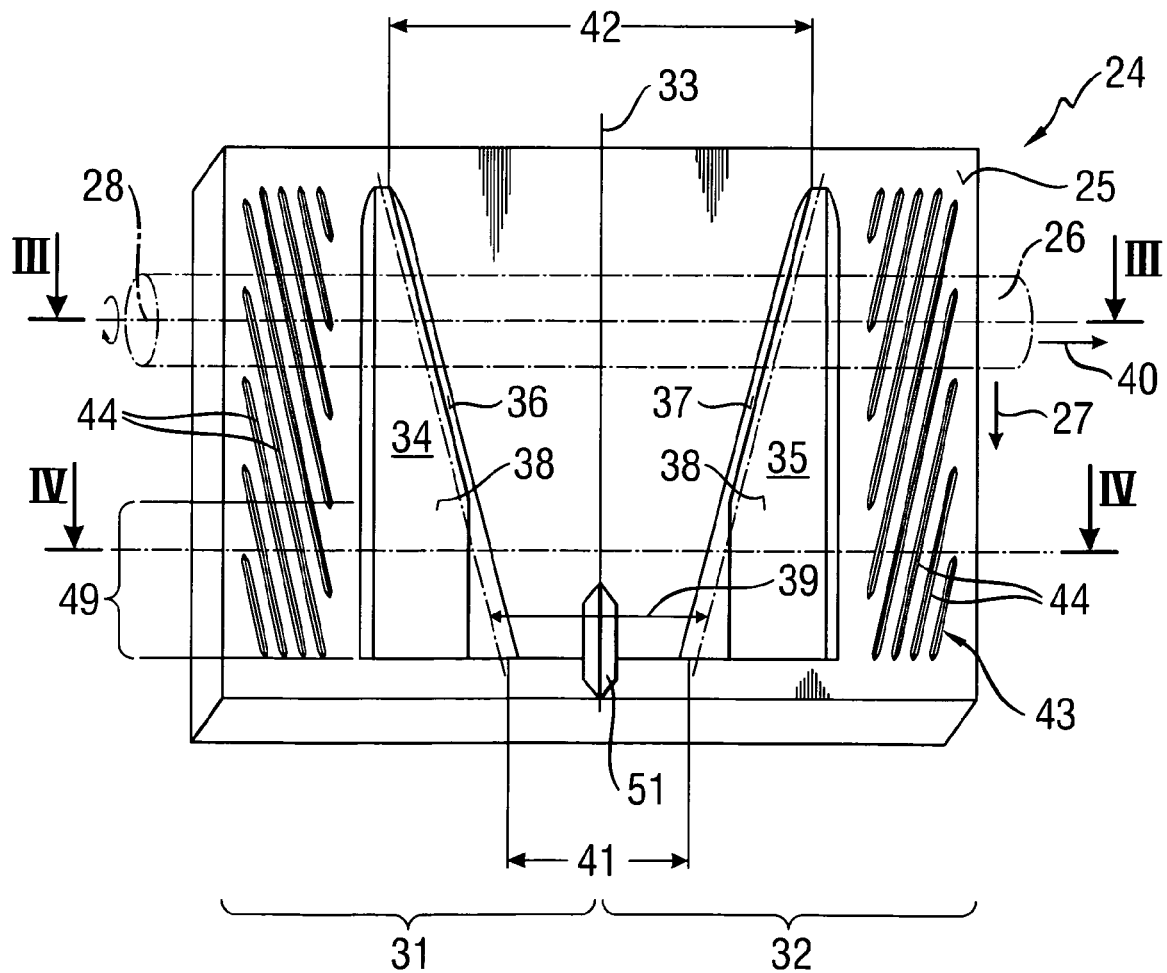
FIG. 2 is a die for roll-forming.
Figure 3:
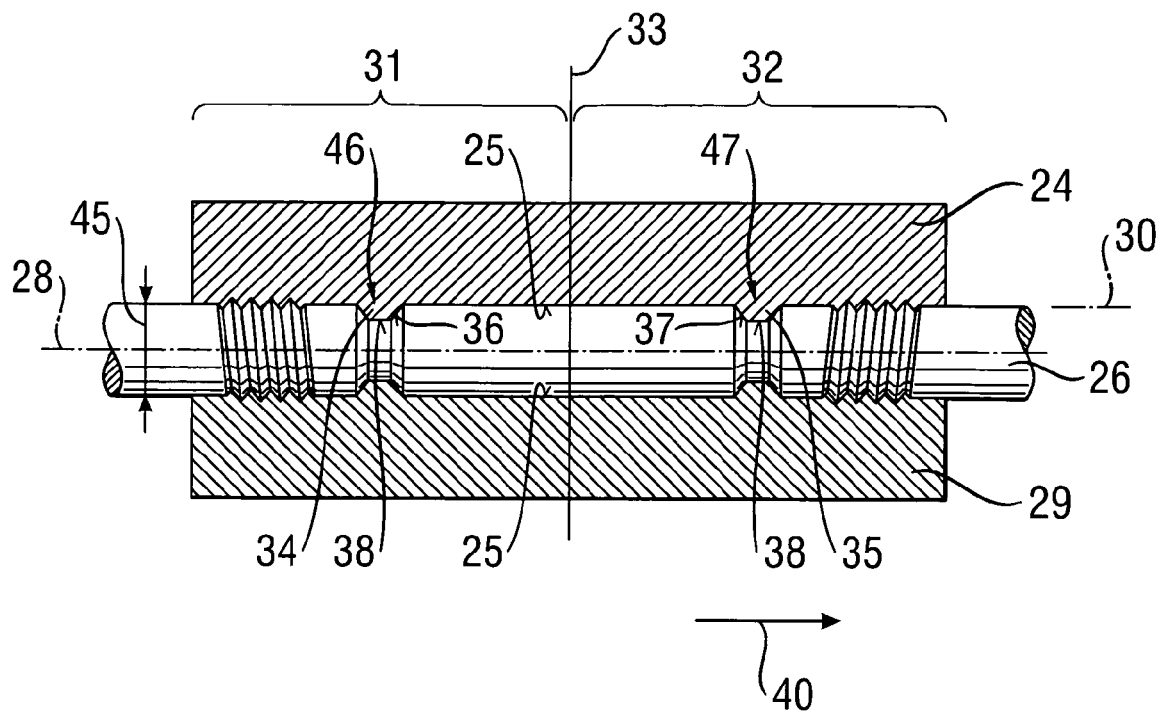
FIG. 3 is a cross-section of the die.
Figure 4:
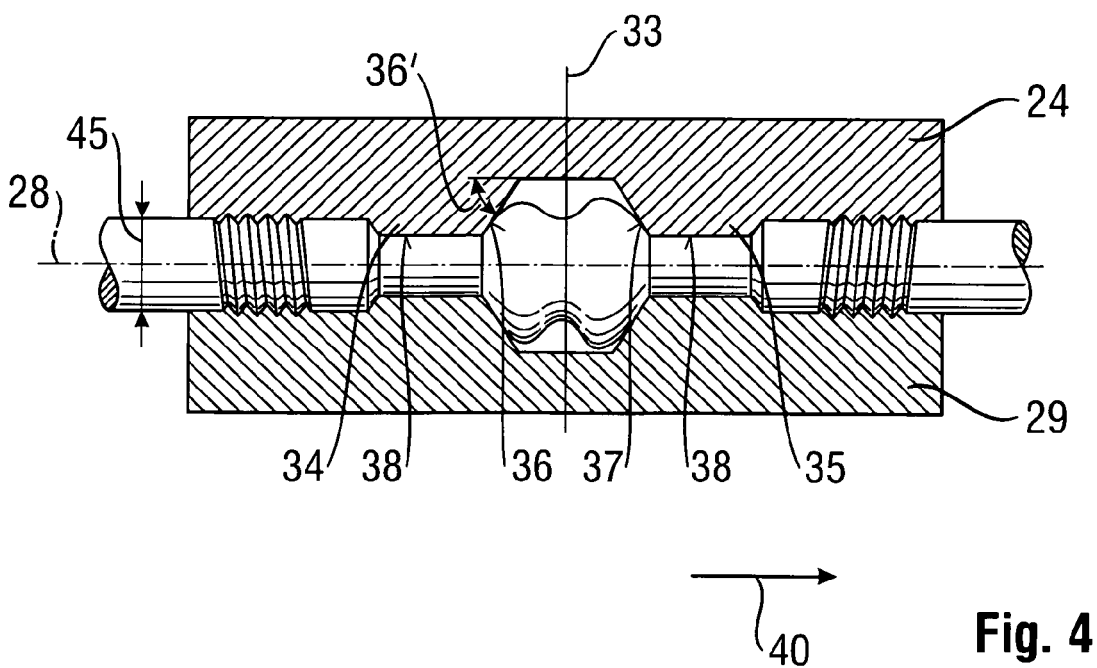
FIG. 4 is a cross-section of the die.

The roll-forming process may make use of a die 24 which top view is illustrated in FIG. 2 and cross-sections in the plane III-III in FIG. 3 and in the plane IV-IV in FIG. 4. The die 24 has a profiled face 25. The projecting structures on the face 25 are used as tools for shaping the contour of the bolts 11. A rod-shaped workpiece 26 is pressed against the face 25 of the die 24. The die's face 25 and the workpiece 26 are moved relatively to each other such that the rod-shaped workpiece 26 rolls along a movement direction 27 over the die's face 25. An axis 28 of the workpiece 26 and the movement direction 27 are transverse. A circumference of the workpiece 26 repeatedly comes into contact with the die's face 25 and becomes structured. The die's face 25 may be flat and the movement direction 27 is linear. The die's face 25 may be formed on a cylindrical drum or related curved machine tools. The drum revolves around an axis perpendicular to the workpiece's axis 28. The movement direction 27 is, hence, an angular direction. Preferably, the workpiece 26 is pressed against the first die 24 by means of a second die 29 which may have an equally profiled face 25. The first die 24 and the second die 29 are moving in opposite directions such that the direction of relative movement of the workpiece 26 is equal to both dies.

The geometry of die's face 25 is described making reference to the intended relative orientation and relative movement direction 27 with respect to the workpiece 26. The die's face 25 has a principal plane 30 which is parallel to a plane defined by the axis 28, defining an axial direction 40, and the movement direction 27. In case a die's face 25 is formed on a drum, the principal plane 30 is bent to a cylindrical plane 30.

The die's face 25 has a first side 31 and a second side 32 separated by a line parallel to the movement direction 27. Both sides 31, 32 are intended to form one bolt 11 each. Preferably, both sides 31, 32 are shaped equally and are mirror symmetric with respect to the line. A center plane 33 is defined by the line and a direction perpendicular to the principal plane 30.

A first wedge-shaped tool 34 is formed on the first side 31 and a second wedge-shaped tool 35 is formed on the second side 32. The wedge-shaped tools 34, 35 may have a triangular or a trapezoid-shaped cross-section perpendicular to the movement direction 27. The side facets 36, 37 of the wedge-shaped tools 34, 35 are inclined by an angle 36' of significantly less than 90 degrees, typically in the range of 10 degrees to 60 degrees, with respect to the principal plane 30. A top facet 38 of the wedges 34, 35 is preferably parallel to the principal plane 30 and at preferably a constant height, i.e. at a constant distance to the principal plane.

The tools 34, 35 are arranged, preferably symmetrically, on opposite sides of a center plane 33. Each of the tools 34, 35 has an inner, inclined side facet 36, 37 which faces the other tool 35, 34. An axial distance 39 between the wedge-shaped tools 34, 35, i.e. their inner, inclined side facets 36, 37, continuously decreases along the movement direction 27. The axial distance 39 is the distance measured in parallel to the axial direction 40. The two wedge-shaped tools 34, 35 are separated by smallest axial distance 41, which is unequal to zero, at their trailing ends in movement direction 27. A largest axial distance 42 appearing at the leading ends of the wedge-shaped tools 34, 35 may be at least 1 cm larger than the smallest axial distance 41.

The wedge-shaped tools 34, 35 may be become wider in the axial direction 40 along the movement direction 27. The active parts of the wedge-shaped tools 34, 35 are the side facets 36, 37 which displace material. The top facet 38 does not penetrate any further into the workpiece 28 or put load on the workpiece 28. The wedge-shaped tools 34, 35 may have a basically triangular shaped top facet 38. In another embodiment, the top facet 38 has a constant width and basically the shape of a parallelogram. The wedge-shaped tools 34, 35 may form a calibration structure at their end. The calibration structure has a constant cross-section perpendicular to the moving direction 27 for the length of the calibration structure.

There may be a thread forming structure 43 on the die's face 25 in each of the first and second sides 31, 32. The thread forming structures 43 are arranged on the outer rim of the die's face 25, i.e. in a larger axial distance to the center plane 33 than the wedge-shaped tools 34, 35. The thread forming structures consist of a plurality of equal oblong wedge-shaped ridges 44. Their longest extension is slightly inclined to the movement direction 27. The ridges 44 are in parallel and a distance between two ridges 44 is less than 5 mm.

FIG. 3 and FIG. 4 illustrate different stages while roll-shaping the workpiece 26. The initial workpiece 26 is a cylindrical or rod-shaped piece of steel. An endless wire of constant diameter 45 may be formed by drawing. The workpiece 26 is provided by cutting off a part of the wire at a predefined length. The length of the workpiece 26 is about twice the length of the bolts 11 to be formed. The roll-forming step elongates the workpiece 26, this may be taken into consideration when selecting the initial length. The steel is preferably chosen to be ductile and suitable for cold metal forming. The steel has in preference a low content of carbon, e.g. less than one percent per weight.

The wedge-shaped tools 34, 35 are penetrating at two points 46, 47 into the workpiece 26. The penetration depth may be at least 2% of the diameter of the workpiece and not more than 10% of the workpiece. The material formerly in the volume now occupied by the tools 34, 35 becomes displaced. The material flows in axial direction towards the closest ends of the workpiece, thereby elongating the workpiece 26 while locally reducing the diameter for the tapered portion 13. This is the preferred flow direction of the material as this reduces stresses due to the tools 34, 35 most efficiently. As the workpiece 26 advances along the movement direction 27 the inner side facets 36, 37 of the wedge-shaped tools 34, 35 are approaching each other. Some of the displaced material is gathered between the tools 34, 35, thereby increasing the diameter above the initial diameter 45. The die 24 may have a recess or opening between the two wedge-shaped tools 34, 35 for allowing the material to pile up. The material is increased in form of two rings adjacent to the tools 34, 35. As the tools 34, 35 further approach the rings meet and form a void 48 or fold between. Attempts to inhibit the void 48 or fold have failed so far. This led to the common opinion that an increase of a diameter causes a workpiece with cracks and inner deformations in the area of the increased diameter.

The wedge-shaped tools 34, 35 may have end sections 49 where the inner, inclined side facets 36, 37 are less inclined with respect to the principle plane 30 and the top facet 38 has a constant axial distance to the center plane 33. This end section 49 forms the conical portion 16. The inclination of the inner side facts 36, 37 may be continuously reduced along the movement direction 27.

The workpiece 26 is separated to two bolts 11 by a ridge 51 along the center plane 33. The ridge 51 can be formed on the die 24. The separation may be effected by other means, for instance, by a saw, a cutter, etc.

It turns out that the deformations of the surface appear in the area of center plane 33. This area later forms the leading end of the bolt 11 which has a low structural importance. The surface of the conical area 16, which is formed by the axially side facets 36, 37, however, is smooth as necessary for the installation principle of the anchor system 10.

The expansion member 12 may be formed of a sheet of metal which is folded around the tapered part 13. The expansion member 12 may well be made of two shells which are clamped around the tapered part 13.

Figure 5:
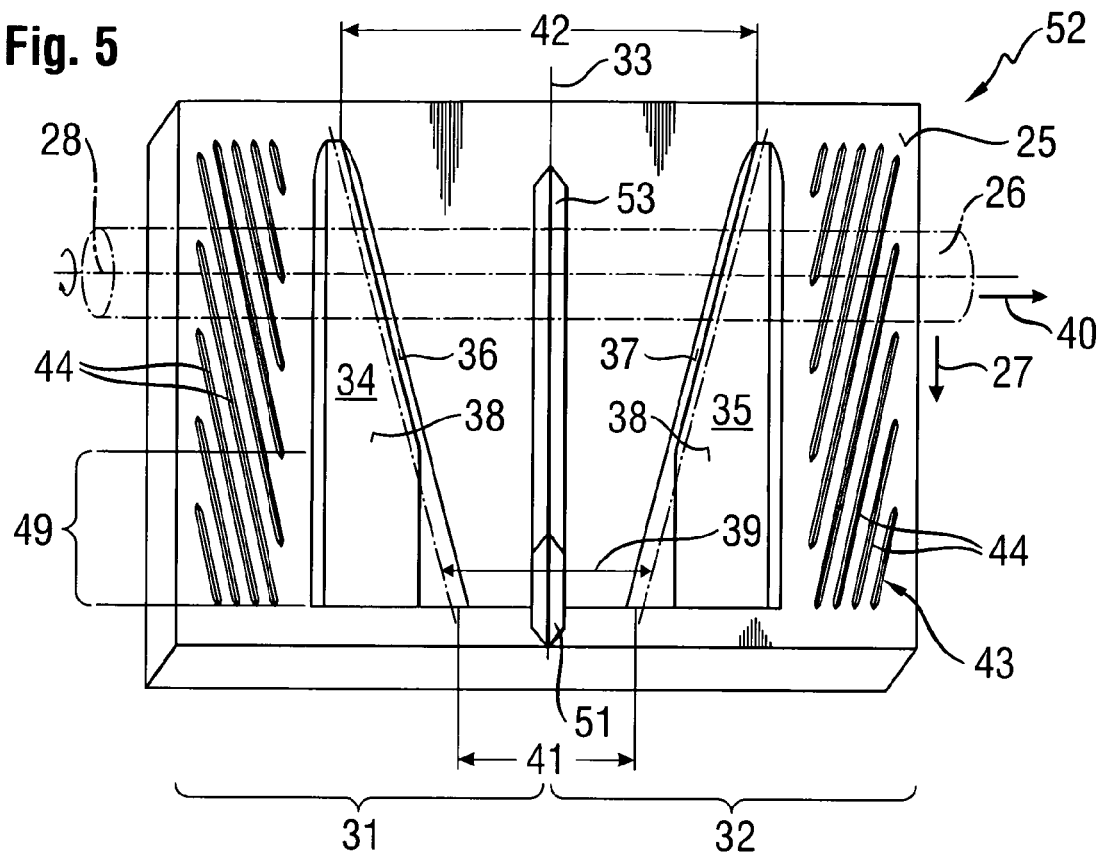
FIG. 5 is a further die.

An alternative of the method uses a die 52 as illustrated in FIG. 5. Additional to the structures explained above, there is a third wedge-shaped tool 53 arranged along the center plane 33. The third wedge-shaped tool 53 penetrates the workpiece 26. The material displaced by the third wedge-shaped tool 53 contributes to an increase of the diameter 18. The third wedge-shaped tool 53 has preferably a length of at least half the length of the two wedge-shaped tools 34, 35. The length is measured along the movement direction 27.

Figure 6:
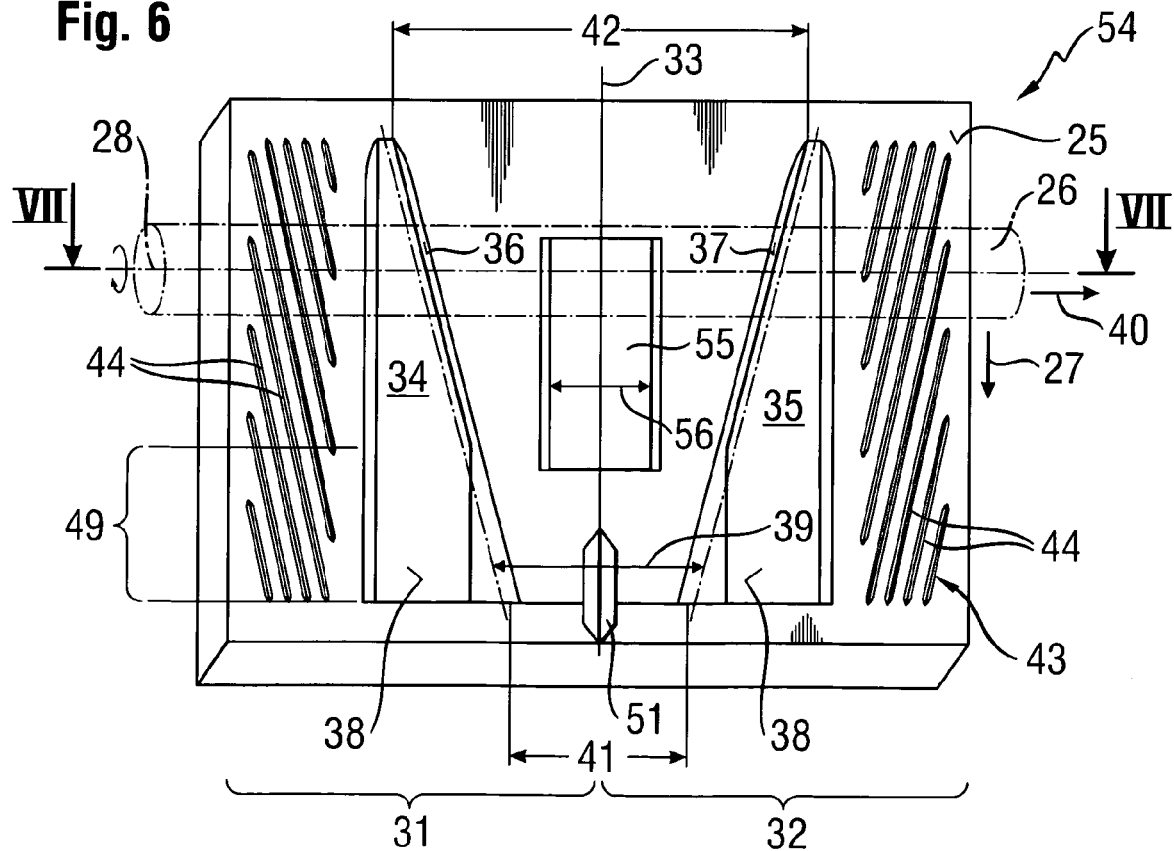
FIG. 6 is a further die.
Figure 7:
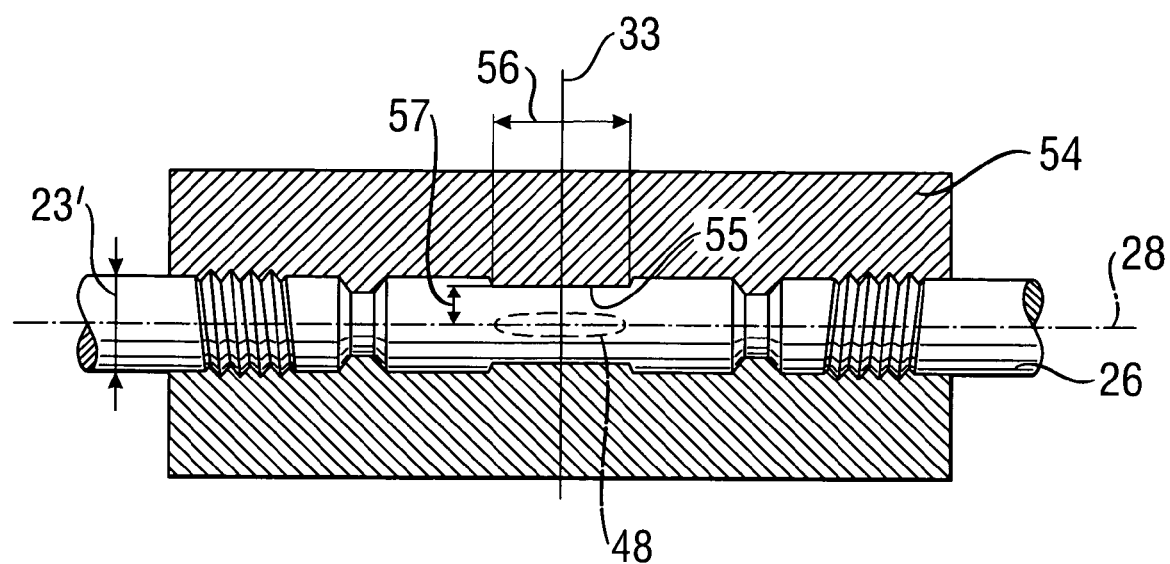
FIG. 7 is a cross-section along VII-VII in FIG. 6.

An alternative of the method uses a die 54 as illustrated in FIG. 6. Additional to the structures explained above, there is an additional flat-shaped tool 55. The flat-shaped tool 55 is designed to squeeze the workpiece 26 to an elliptical cross-section. This may be achieved by a huge width 56, i.e. dimension in axial direction 40, of a top facet 57 of the flat-shaped tool 55, which is pressed against the workpiece 26. The width 56 is selected several times larger than a length, dimension in movement direction 27, of an area of contact between the top facet 57 and the workpiece 26. The width 56 may be, for instance, larger than half the diameter of the workpiece 26. The distance of the top facet 57 to the axis 28 is slightly smaller than a diameter 23' of the workpiece 26, for instance, about a 0.1% to 2% of the diameter of the workpiece 26 or by about 0.01 mm to 0.5 mm. The forces applied on the flat-shaped tool 55 are maintained or even increased. This helps to increase the circumference due to the tangential deformation of the surface area leading to a slightly elliptical shape, even if this is counter intuitive and a reshaping to a cylindrical shape would be expected. When the elliptical shape reaches a critical relation of its longest axis to its shortest axis, the material cracks and a void 48 develops along the axis 28. Once, the void 48 has a desired diameter, the forces of the flat-shaped tool 55 on the workpiece 26 are reduced, for instance, by increasing the distance of the flat-shaped tool 55 to the axis 28. The workpiece 26 becomes reshaped to a cylindrical form, the void 48 along the axis 28, however remains, thereby increasing the outer diameter.

The flat-shaped tool 55 may arranged between the two wedge-shaped 34, 35 over their full length along the movement direction 27. The flat-shaped tool 55 may finish at the end section 49 of the wedge-shape 34, 35.

The methods above were described with use of a die. Instead of a die, an individual roller for each of the wedge-shaped tools 34, 35, and other tools listed, may be used.

The invention claimed is:

1. A method of forming anchors, comprising:
 roll forming a workpiece having a rod shaped body, that comprises a longitudinal axis running between a first end and a second end thereof, by penetrating the workpiece with two wedge-shaped tools at two points, wherein the two points are arranged on opposite sides of and axially separated by a plane perpendicular to the longitudinal axis of the workpiece, and wherein the two wedge-shaped tools are configured to axially approach the plane as the workpiece is revolved around the longitudinal axis to displace material and cause a diameter of the workpiece to increase in a central region between the two wedge-shaped tools as the workpiece is roll formed;
 dividing the roll-formed workpiece along the plane to form a first anchor bolt and a second anchor bolt;
 applying a first sleeve around the first anchor bolt; and applying a second sleeve around the second anchor bolt.

2. The method according to claim 1, wherein a third wedge-shaped tool penetrates the workpiece in the plane while the two wedge-shaped tools are approaching the plane.

3. The method according to claim 1, wherein said roll forming further comprises forming a void along the longitudinal axis by penetrating the workpiece with a flat-shaped tool in an area between the two wedge-shaped tools.

4. The method according to claim 3, wherein said roll forming further comprises increasing a radial distance of the flat-shaped tool to the longitudinal axis after said forming the void.

5. The method according to claim 3, wherein said roll forming comprises squeezing the workpiece, with the flat-shaped tool, into an elliptical cross-section.

6. The method according to claims 1, wherein said roll forming further comprises penetrating the workpiece, with a flat-shaped tool, in an area between the two wedge-shaped tools, wherein the flat-shaped tool and the workpiece have a contact area of a first dimension parallel to the longitudinal axis and equal to at least half the diameter of the workpiece.

7. The method according to claim 6, wherein the flat-shaped tool penetrates the workpiece by having a radial distance to the longitudinal axis of 0.1% to 2% less than the diameter of the workpiece.

8. The method according to claim 6, wherein said roll forming further comprises increasing a radial distance of the flat-shaped tool to the longitudinal axis after said forming the void.

9. The method according to claim 6,
wherein said roll forming comprises squeezing the workpiece, with the flat-shaped tool, into an elliptical cross-section.

10. The method according to claims 1, wherein the roll forming further comprises penetrating the work piece, with a flat-shaped tool, in a contact area between the two wedge-shaped tools, wherein the contact area of the flat-shaped tool and the workpiece have a first dimension parallel to the longitudinal axis and a second circumferential dimension of the workpiece, wherein the first dimension is at least twice as large as the second dimension.

11. The method according to claim 10, wherein the flat-shaped tool penetrates the workpiece by having a radial distance to the longitudinal axis of 0.1% to 2% less than the diameter of the workpiece.

12. The method according to claim 1, wherein said applying the first sleeve comprises applying an expansion-member sleeve around the first anchor bolt.

13. The method according to claim 1, wherein said applying the first sleeve comprises applying the first sleeve around a tapered portion of the first anchor bolt.

14. The method according to claim 1, further comprising cutting the workpiece from a wire.

15. The method according to claim 1, wherein said applying the first sleeve comprises clamping at least two shells around a tapered portion of the first anchor bolt.

16. The method according to claim 1, wherein said applying the first sleeve comprises folding at least one sheet of metal around a tapered portion of the first anchor bolt.

17. The method according to claim 1, wherein said roll forming the workpiece comprises rolling and moving the workpiece with respect to a die that has a first side and a second side on opposite sides of the plane, wherein the first side forms a first anchor bolt and wherein the second side forms a second anchor bolt that is a mirrored version of the first anchor bolt with respect to the plane.

18. The method according to claim 17, wherein said moving comprises moving the workpiece linearly with respect to a flat face of the die.

19. The method according to claim 17, wherein said moving comprises moving the workpiece with respect to a cylindrical face of the die.

20. The method of claim 17, wherein said roll forming comprises accumulating material displaced by the two wedge-shaped tools in an opening between the two wedge-shaped tools.

21. The method according to claim 1, wherein said roll forming further comprises:
tapering a portion of the workpiece to a cylindrical tapered portion via a first inclination of inclined facets of the two wedge-shaped tools; and
forming a conical portion from the workpiece via a second inclination of the inclined facets of the two wedge-shaped tools, wherein the second inclination succeeds the first inclination when the two wedge-shaped tools approach closer than a predefined distance.

22. A method of forming anchors, comprising:
roll forming a workpiece having a rod shaped body, that comprises a longitudinal axis running between a first end and a second end thereof by: penetrating the workpiece with two wedge-shaped tools at two points, wherein the two points are arranged on opposite sides of and axially separated by a plane perpendicular to the longitudinal axis of the workpiece, and wherein the two wedge-shaped tools are configured to axially approach the plane as the workpiece is revolved around the longitudinal axis to displace material and cause (i) a diameter of the workpiece to decrease in first and second regions and form a first tapered part and second tapered part axially separated by the plane, and (ii) the diameter of the workpiece to increase in a central region between the two wedge-shaped tools and form first and second conical leading ends that respectively slope radially outward from the first and second tapered parts as the workpiece is roll formed; and
dividing the workpiece with a ridge along the plane to form a first anchor bolt comprising the first tapered part and the first conical leading end and a second anchor bolt comprising the second tapered part and the second conical leading end; applying a first sleeve around the first tapered part of the first anchor bolt; and applying a second sleeve around the second tapered part of the second anchor bolt.

* * * * *